Figure 1:
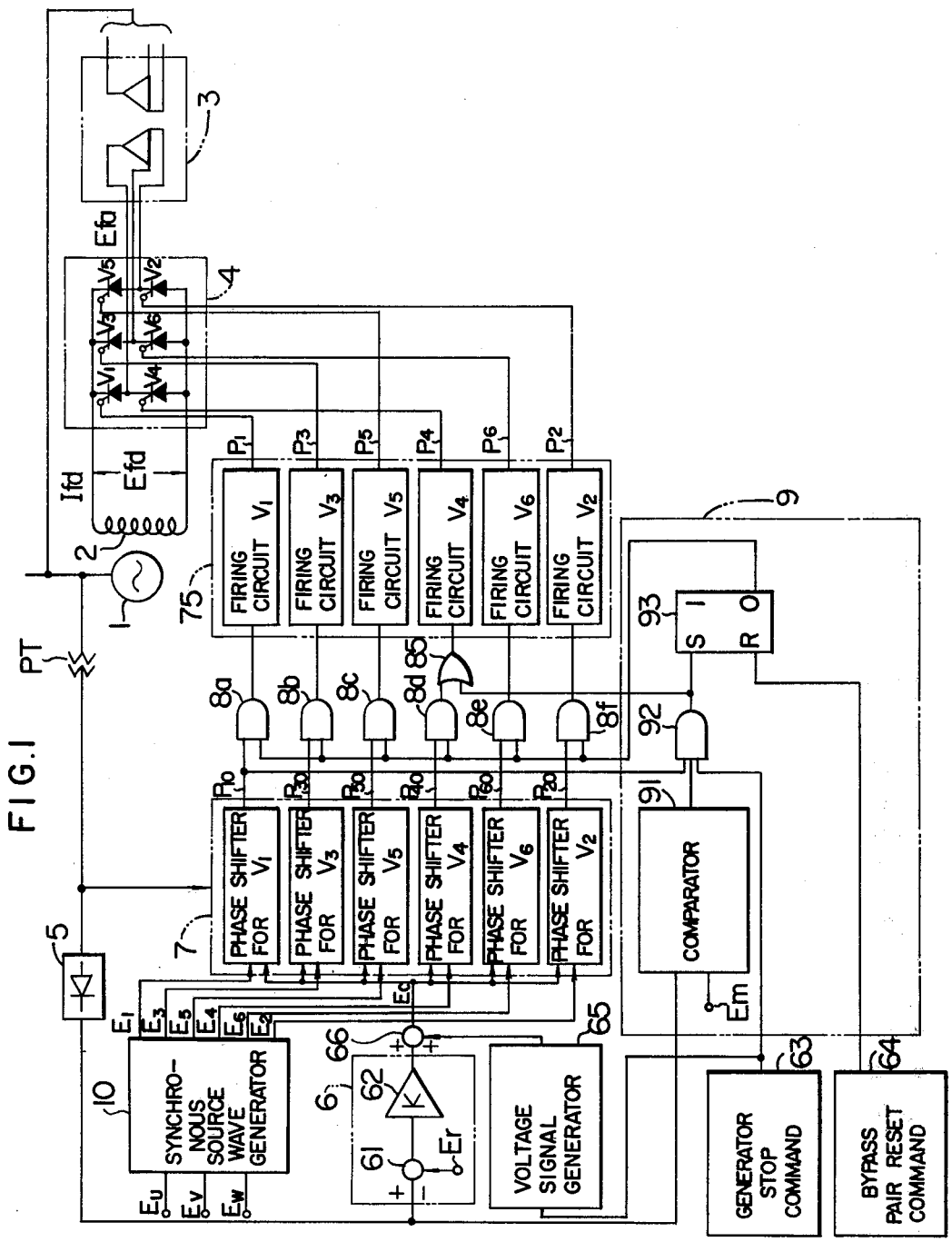

United States Patent [19]

Goto et al.

[11] 4,129,818
[45] Dec. 12, 1978

[54] EXCITATION CONTROL APPARATUS SUITED FOR NORMAL STOP OPERATION OF SYNCHRONOUS GENERATORS

[75] Inventors: Masuo Goto; Akira Isono, both of Hitachi; Yasushi Momochi, Hitachiota; Takaaki Kai, Tokaimura, all of Japan

[73] Assignee: Hitachi, Ltd., Japan

[21] Appl. No.: 806,862

[22] Filed: Jun. 15, 1977

[30] Foreign Application Priority Data

Jun. 18, 1976 [JP] Japan .................................. 51/71191

[51] Int. Cl.$^2$ ............................................. H02P 3/06
[52] U.S. Cl. ........................................ 322/10; 322/59; 322/73
[58] Field of Search .................................. 322/10–13, 322/99, 100; 361/20, 21; 290/46; 322/59, 72, 73, 28; 363/124

[56] References Cited

U.S. PATENT DOCUMENTS

| | | | |
|---|---|---|---|
| 3,314,001 | 4/1967 | Brockman | 361/21 |
| 3,564,391 | 2/1971 | Dinger | 322/25 |
| 3,605,006 | 9/1971 | Nagae | 322/25 X |
| 3,673,488 | 6/1972 | Spiller | 322/28 |

Primary Examiner—Robert J. Hickey
Attorney, Agent, or Firm—Craig & Antonelli

[57] ABSTRACT

Disclosed is an apparatus for carrying out normal stop of a synchronous generator in an advantageous manner without use of a field breaker. The apparatus comprises a six-phase thyristor converter for controlling field excitation of the synchronous generator in dependence upon terminal voltage thereof, which converter exhibits not only a forward conversion function (power rectifier) but also backward conversion function (power inverter). When a generator operation stop command is produced, the operation of the converter in power rectifier mode is changed over to power inverter mode. During the inverter mode operation, when the terminal voltage of the synchronous generator becomes lower than a preset value, a pair of counter part thyristors among the thyristors constituting the converter are simultaneously fired to bring about a short-circuited state in the excitation circuit with all the firing pulses supplied to the other thyristors being suppressed, thereby to complete the stopping operation for the synchronous generator.

8 Claims, 23 Drawing Figures

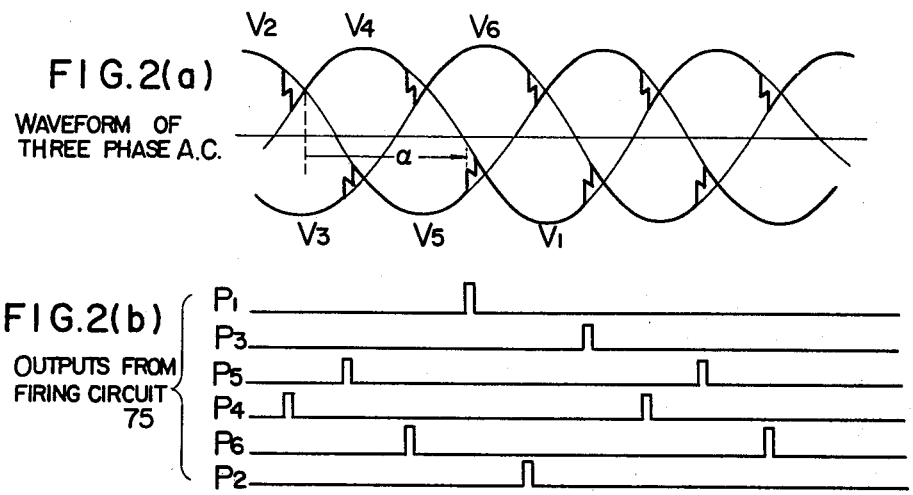
FIG.2(a) WAVEFORM OF THREE PHASE A.C.
FIG.2(b) OUTPUTS FROM FIRING CIRCUIT 75
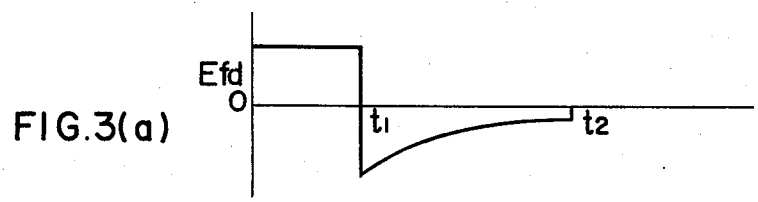
FIG.3(a)
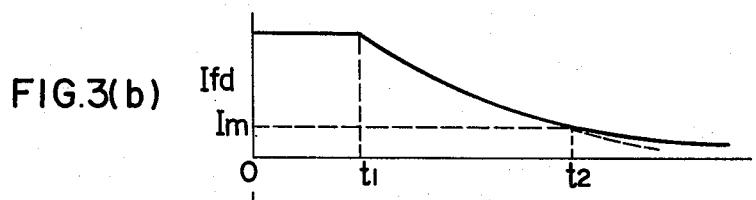
FIG.3(b)
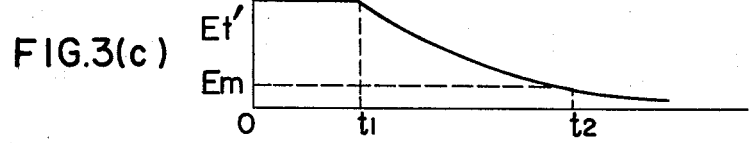
FIG.3(c)

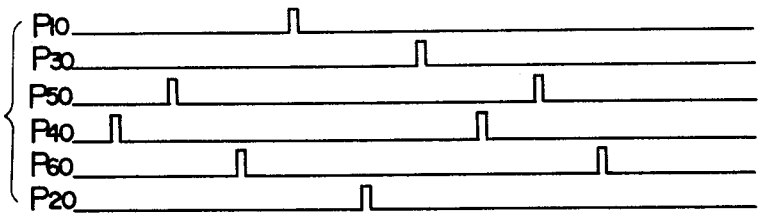
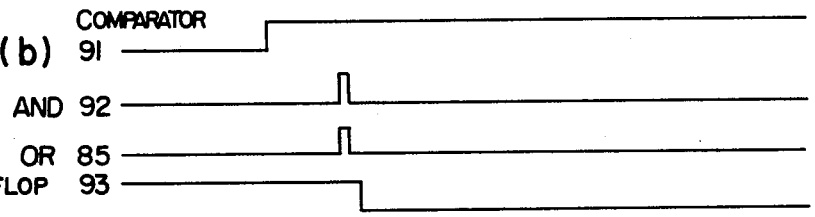
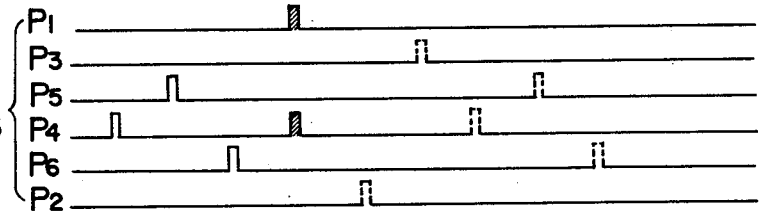
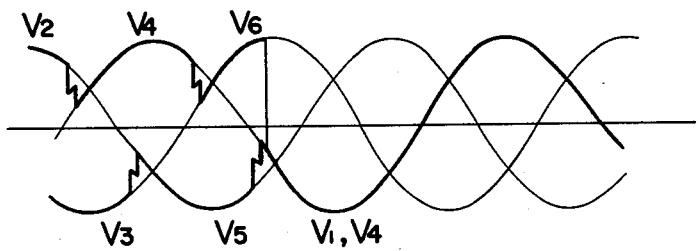

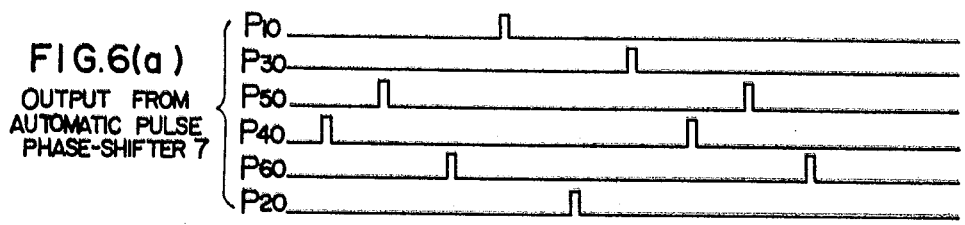
FIG.6(a) OUTPUT FROM AUTOMATIC PULSE PHASE-SHIFTER 7
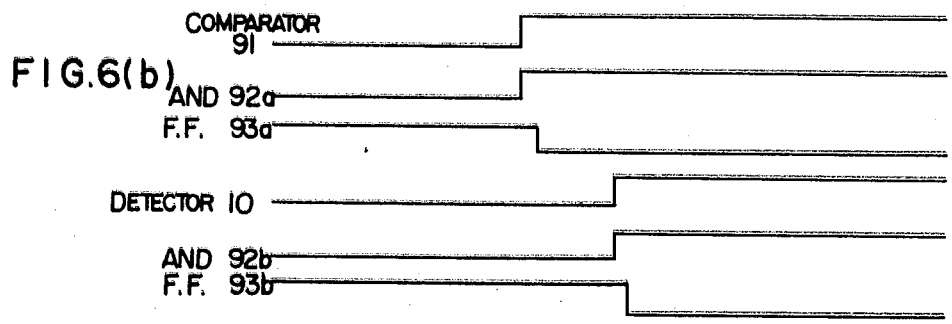
FIG.6(b)
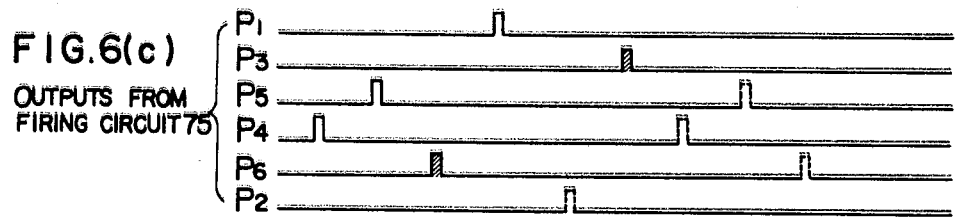
FIG.6(c) OUTPUTS FROM FIRING CIRCUIT 75
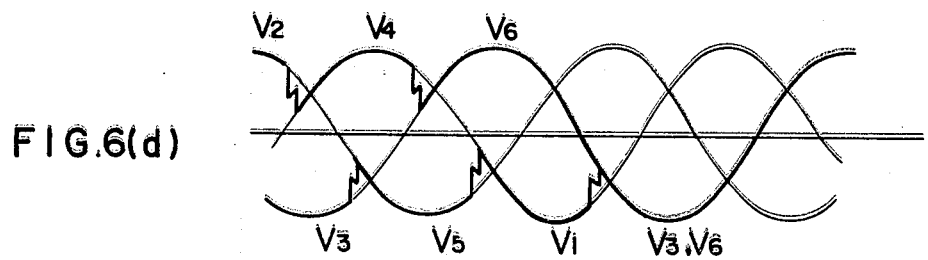
FIG.6(d)

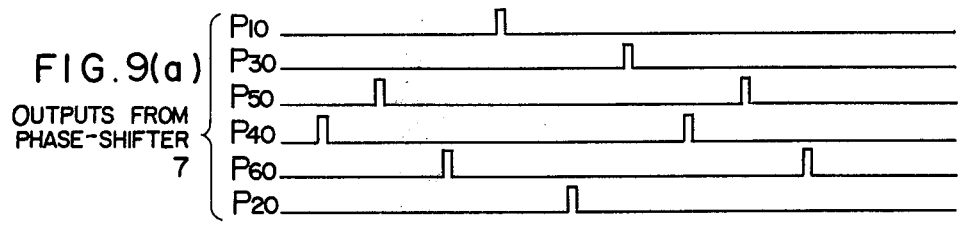
FIG.9(a) OUTPUTS FROM PHASE-SHIFTER 7
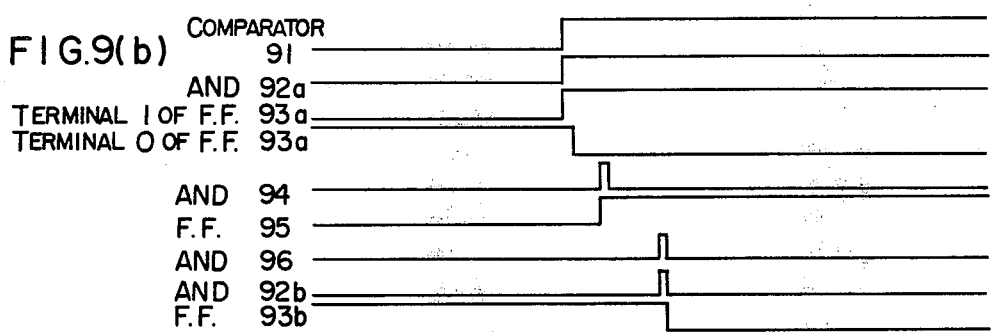
FIG.9(b)
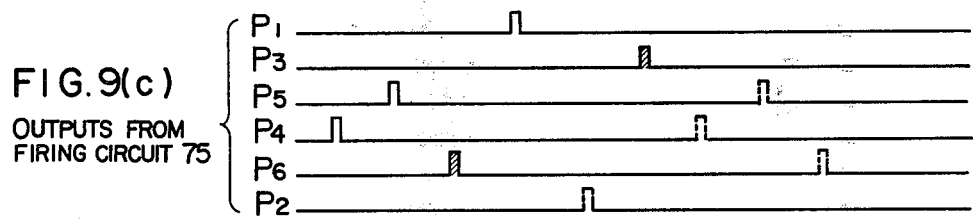
FIG.9(c) OUTPUTS FROM FIRING CIRCUIT 75
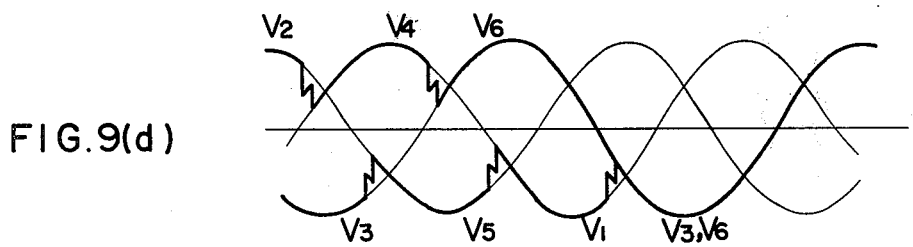
FIG.9(d)

EXCITATION CONTROL APPARATUS SUITED FOR NORMAL STOP OPERATION OF SYNCHRONOUS GENERATORS

The present invention relates in general to an excitation control apparatus for a synchronous generator and in particular to an excitation control apparatus of a type in which the normal stoppage of the synchronous generator is effected through control of firing phase angle of a converter for regulating field current of the synchronous generator.

In general, stoppage of the synchronous generator (hereinafter referred to simply as generator) is brought about due to two typical causes, i.e. external and internal causes. As one example of the external causes or factors for giving rise to the stoppage of the generator, there is such a case in which the synchronous generator has to be disconnected from an associated power transmission line due to occurrence of a serious failure therein. On the other hand, the internal cause for stopping the generator may often be ascribable to a specific operation scheme and/or maintenance in a power plant. In the former case, the synchronous generator has to be stopped as rapidly as possible. In contrast thereto, the stoppage of the generator due to the internal causes which may be called normal stoppage is not a matter of urgency. The invention is directed primarily to the normal stoppage of the synchronous generator.

As is well known in the art, a shunt connected self-excited generator is provided with an excitation circuit for supplying a field current through the output voltage of the generator. A field current interrupter or field breaker is provided in the excitation circuit. When the generator is to be stopped, the output power or load of the generator is first decreased to zero. Thereafter, the field breaker is operated to open the circuit and simultaneously a field current discharging resistor is connected into the excitation circuit thereby dissipating the electric energy stored in the field winding as resistance loss or heat. In this connection, it is noted that, when the stopping and starting of the generator are frequently repeated, the number of operations of the field breaker is also increased, resulting in relatively rapid wearing of contacts and other parts of the extinction chamber of the breaker due to arc produced upon operations thereof in particular when the excitation circuit is subjected to a high voltage. Accordingly, the use life of the field breaker is of course shortened. For example, the synchronous generator employed in a pumping power plant has to be stopped and started every time, the power mode of the generator is changed from the power generation mode to the pumping mode or vice-versa, and thus there will likely arise the problems described above.

As an attempt to obviate the above problem, it has been already proposed to carry out the normal stoppage of the synchronous generator through a firing phase control of a converter for regulating the field current of the generator. In more particular, upon stopping the generator, thyristors constituting the converter for regulating the field current are controlled in respect of the firing angle or phase thereby to feed back positively the energy in the field winding to the a.c. side thereof or the generator. Namely, when a command to stop the generator is given, the firing angle $\alpha$ for the thyristors is delayed more than 90°, whereby the field regulating converter is caused to operate in the mode of a power inverter. This results in a decreased field current as well as a decreased output voltage of the generator. The voltage at the a.c. side of the converter is also simultaneously decreased, and the operation of the converter as the power inverter will become impossible when the a.c. voltage is lowered below a predetermined value. Then, only those thyristors which are still conducting at that time continue to pass the field current. In other words, the field current will then flow through the field winding, a conducting thyristor, a power transformer winding and the other conducting thyristor in this order and is subjected to natural attenuation. This means that a d.c. current flows through the winding of the power transformer which is connected to the conducting thyristors, and hence the iron core of the transformer will be saturated to give rise to a large current flow in the primary winding and thus the transformer will undergo thermal and/or mechanical stress. This means that the power transformer is operated under severe or unfavorable conditions. For example, failure in commutation will occure in the thyristors constituting the converter with a relatively high probability when the voltage at its a.c. side is about 30% of the rated voltage. If such failure in commutation occur, the field current at that time should amount to about 30% of the field current under no-load, and would eventually flow through the secondary winding of the power transformer connected at the a.c. side of the converter, thereby saturating the transformer. Under such condition, a large excitation current will flow through the primary winding of the power transformer since the primary winding is applied with an a.c. voltage corresponding to 30% of the rated voltage, involving failure in the power transformer due to the thermal or mechanical stresses induced by such large current. Heretofore, the power transformer has been designed in consideration of the unfavorable conditions described above and imparted with a large capacity so as to withstand such possible severe operations. This means a large expense from the economic viewpoint. In order to evade from such a disadvantage, it is necessary to provide means for preventing the field current from flowing into the power transformer upon occurrence of failure in commutation of the thyristors constituting the converter, when the generator is to be stopped.

Accordingly, an important object of the invention is to provide an excitation control apparatus which is capable of preventing a d.c. current from flowing to a transformer associated with a converter at a normal stoppage of a synchronous generator.

With the above object is view, it is proposed according to one aspect of the invention that a set of selected thyristors constituting the converter are made to be conductive at the time when the output voltage of the synchronous generator is lowered below a predetermined value during the operation of the converter in the power inverter mode at the normal stoppage of the generator. Such thyristor set as made to be conductive is hereinafter referred to as "bypass pair". According to the teaching of the invention, the excitation circuit is short-circuited just before the possible occurrence of failure in commutation, whereby the field current is subjected to natural attenuation with a time constant provided by the excitation circuit inclusive of the field winding. Thus, the transformer is protected from the field current flowing therein during stoppage operation of the synchronous generator, obviating the necessity of designing the transformer with an unnecessarily large capacity in consideration of the field current flowing into the transformer as was the case of the hitherto known converter transformer, which is of course very advantageous from the economic viewpoint.

Figure 5:
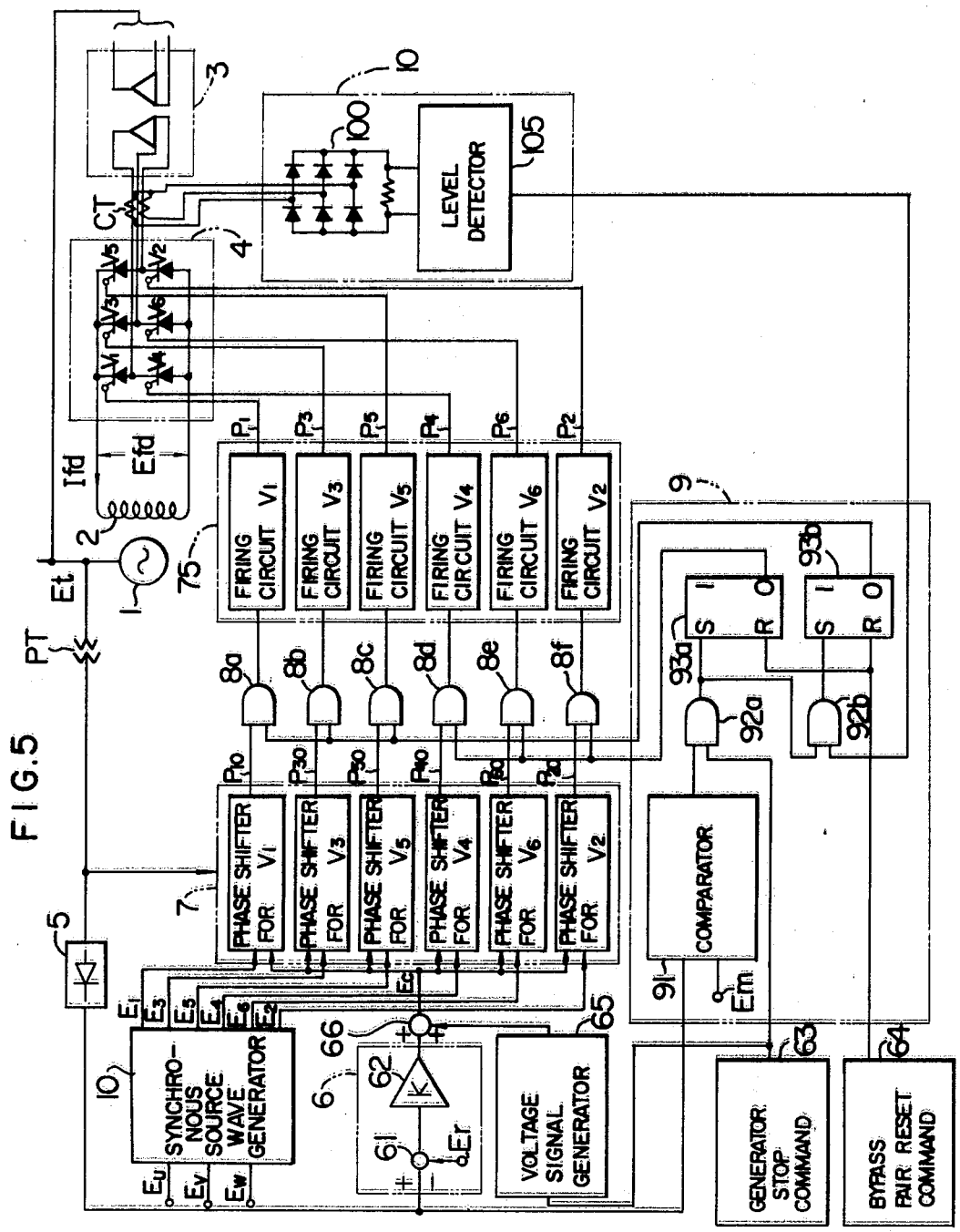
Figure 7:
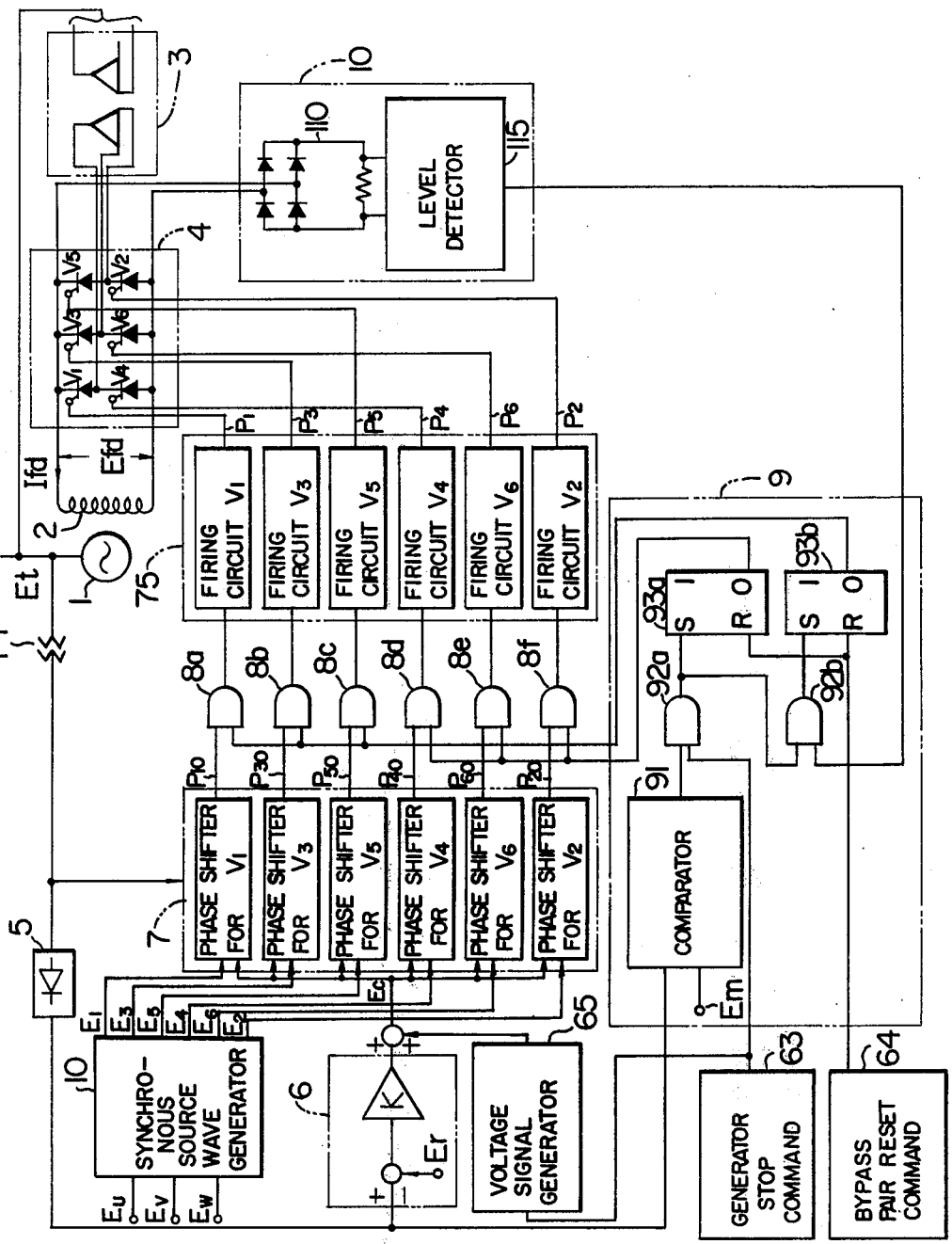
Figure 8:
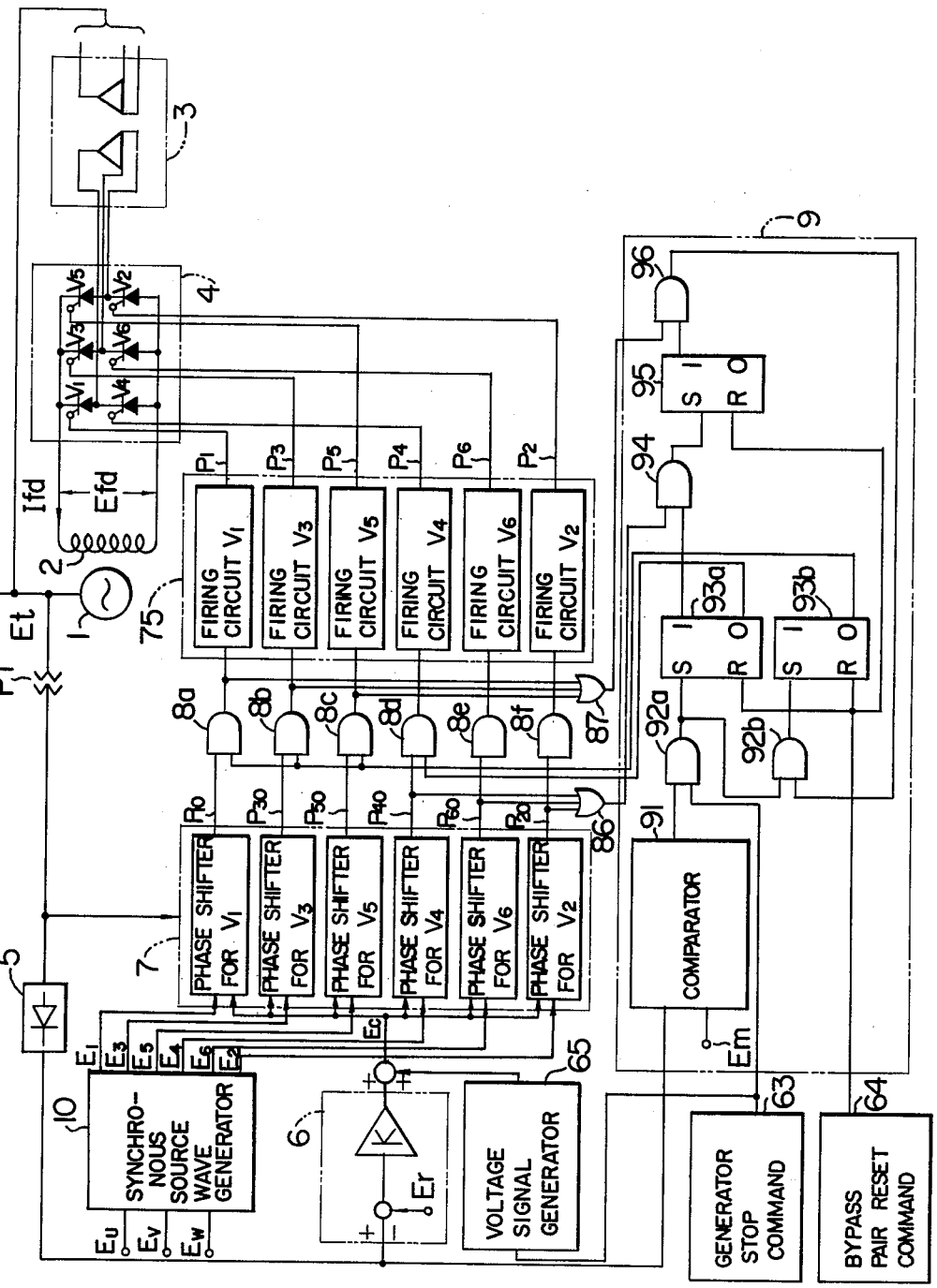
Figure 10A:
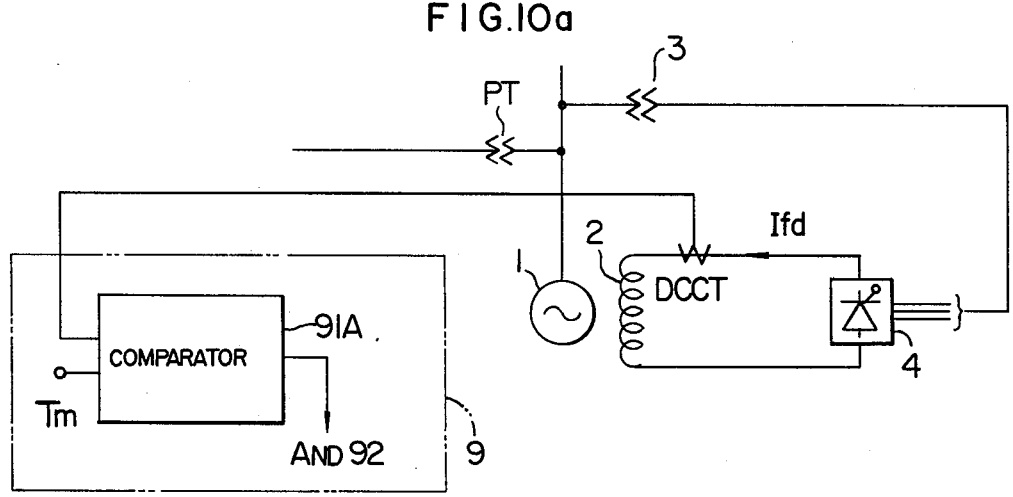
Figure 10B:
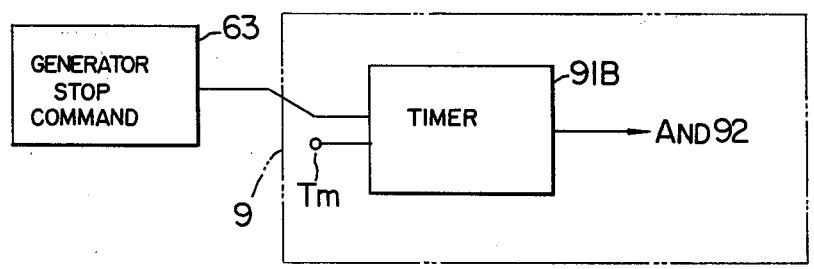

The invention will be more readily understood from description of exemplary embodiments thereof taken in conjunction with the accompanying drawings, in which:

FIG. 1 is a block diagram showing a general arrangement of an embodiment of the excitation control apparatus for a synchronous generator to which the teachings of the invention are applied, FIG. 2a is a waveform diagram to illustrate inverter operation of a converter and show relationship between three phase a.c. waveforms and controlled delay angle α, FIG. 2b shows firing pulses to be applied to thyristors constituting the converter, FIGS. 3a, 3b and 3c are diagrams showing variation in a.c. voltage $E_{fd}$, field current $I_{fd}$ of the converter and the output voltage of the generator, respectively, as a function of time at operation of the converter including a period $t_1$ to $t_2$ in which the converter is operated as the inverter, FIGS. 4a, 4b, 4c and 4d graphically illustrate waveforms of output signals available from various parts constituting the excitation control apparatus for synchronous generator shown in FIG. 1, FIG. 5 is a block diagram showing a general arrangement of the excitation control apparatus for the synchronous generator in accordance with another embodiment of the invention, FIGS. 6a, 6b, 6c and 6d graphically illustrate waveforms of output signals available from various parts constituting the excitation apparatus shown in FIG. 5, FIG. 7 is a block diagram showing still another embodiment of the excitation control apparatus for generator constructed in accordance with the teachings of the invention, FIG. 8 is a block diagram showing a further embodiment of the excitation control apparatus to which the invention is applied, FIGS. 9a, 9b, 9c and 9d graphically illustrate output signal waveforms available from various parts constituting the excitation control apparatus shown in FIG. 8, FIG. 10a shows implementation of a comparator employed in the various embodiments of the invention by utilizing the field current, and FIG. 10b shows implementation of the comparator by using a timer.

Now, referring to FIG. 1 which shows an embodiment of the excitation control apparatus for synchronous generator according to the invention in which the bypass pair of thyristors described hereinbefore are established by applying synchronized firing pulses to both the thyristors constituting one pole of the converter and the opposite pole thereof, thereby to inhibit the field current from flowing into the power source transformer. It is also intended that the circuit to establish the bypass pair is to be realized in a simple arrangement. In this figure, reference numeral 1 denotes a synchronous generator, 2 a field winding of the generator, 3 a power transformer, and numeral 4 denotes a converter for regulating the field current $I_{fd}$ of the synchronous generator 1 on the basis of the output voltage $E_t$ of the generator applied through the power transformer 3. The converter 4 is composed of thyristors $V_1$ to $V_6$ arranged in Gratz connection for a six-phase rectifier system. Numeral 5 designates a rectifier for rectifying the output voltage $E_t$ obtained through a potential transformer PT. In practice, a smoothing filter (not shown) having a small time constant is inserted in series to the rectifier 5. Numeral 6 denotes an automatic voltage regulator which is composed of an adder 61 and a gain regulator 62 and serves for producing deviation of the output voltage $E_t$ from a reference voltage $E_r$ with a predetermined gain. Reference numeral 7 denotes an automatic pulse phase-shifter for controlling phases of firing pulses $P_1$ to $P_6$ applied to the thyristors constituting the converter. Numerals 8a, 8b, ..., 8f denote AND gates, 85 denotes an OR gate and 75 denotes a firing circuit for producing firing pulses P1 to P6 in response to output pulses $P_{10}$ to $P_{60}$ from the automatic pulse phase-shifter. Block 63 represents a generator stop command unit which produces a logic "1" output when a suitable means, such as a key switch (not shown), is operated by an operator to stop the generator in response to a stop command and produces logic "0" output which represents that no stop command is present. The logic output "1" or "0" is fed to a voltage signal generator 65 and a circuit 9 for establishing the bypass pair. The voltage signal generator 65 is arranged to produce a voltage output of a predetermined level when the generator stop command unit 63 produces the logic output "1", and to produce no voltage output when the unit 63 produces the logic output "0". The voltage output of the generator 65 is applied to an adder 66 to be added with the output of the automatic voltage regulator 6 thereby producing a control voltage $E_c$ to be applied to an automatic pulse phase-shifter unit 7. The level of the voltage output is determined so that the control voltage $E_c$ causes the phase-shifter unit 7 to produce firing pulses adapted to cause the converter 4 to operate in an inverter mode. When no stop command is present, the voltage signal generator 65 receives a logic "0", resulting in no voltage output therefrom. Thus the output from the adder 66 is the same as the output of the automatic voltage regulator 6. The pulse phase-shifter unit 7 includes six pulse phase-shifters for producing firing pulses for the thyristors $V_1$ to $V_6$, respectively. A synchronous source wave generator 10 is provided to receive phase voltages $E_U$, $E_V$ and $E_W$ the three-phase output of the generator and produce six-phase line voltage signals $E_1$ to $E_6$ which are applied to the pulse phase-shifters for $V_1$ to $V_6$, respectively. Each of the pulse phase-shifters produces a firing pulse, during each cycle of the line voltage applied thereto, with a phase angle determined by the control voltage $E_c$. Such a pulse phase-shifter is well-known and may be constructed to include a waveform converter to receive the line voltage signal of sine wave and convert it into a signal of rectangular waveform, an integrator to integrate the signal of rectangular waveform and produce a signal of saw-tooth waveform and a comparator having two inputs, one for the saw-tooth waveform signal and the other for the control voltage $E_c$, to produce a firing signal when the amplitude of the saw-tooth waveform signal reaches the level of the control voltage $E_c$. The bypass pair establishing circuit 9 is composed of a comparator 91, an AND gate 92 and a flip-flop 93 and serves to make a pair of thyristors among $V_1$ to $V_6$ conductive under several conditions. The comparator 91 is so arranged to produce a logic "1" signal when the output voltage $E_t$ of the generator is lowered below a predetermined voltage $E_m$ and otherwise a logic "0" signal is produced. Further, when the logic "1" is input to the set terminal S of the flip-flop 93, the logic level at the output "0" terminal is changed from logic "1" to "0". Block 64 represents a bypass pair reset command unit adapted to produce logic "1" representative of command to reset the bypass pair. When no reset command is present, the logic "0" output from the reset command unit 64 is applied to the reset input terminal R of the flip-flop 93.

Now, the operation of the excitation control apparatus shown in FIG. 1 will be described.

In a normal operating condition of the synchronous generator 1, the converter 4 operates to feed the field current $I_{fd}$ through the output voltage of the generator 1 by converting an a.c. current available through the power transformer 3 into a d.c. current. When a generator stop command is given, the command unit 63 produces a logic "1" signal to the voltage signal generator 65 and as a result the output from the generator 65 is added with the output from the automatic voltage regulator 6 at the adder 66. The sum signal from the latter is applied to the automatic pulse phase-shifter 7 as the control voltage $E_c$. Since the control voltage $E_c$ is in a proportional relationship to the controlled delay angle $\alpha$ of thyristor, the angle $\alpha$ becomes greater as the control voltage $E_c$ becomes higher due to addition of the output from the voltage signal generator 65. When the controlled delay angle $\alpha$ is made greater than 90°, e.g. at 150° by adjusting the output level of the generator 65, the converter 4 will then operate in a so-called inverter mode to produce inverse voltage. FIGS. 2a and 2b illustrate such condition, wherein three-phase a.c. waveforms in the inverter mode operation are shown in FIG. 2a, while firing pulses $P_1$ to $P_6$ produced by the firing circuit 75 and applied to the individual thyristors $V_1$ to $V_6$ are shown in FIG. 2b. Further, the conditions in which the normal operation of the converter 4 is changed to the inverter mode operation are illustrated in FIGS. 3a to 3c. Assuming that the generator stop command is produced at a time point $t_1$, a backward voltage such as shown in FIG. 3a is generated in the excitation circuit. Then, the field current $I_{fd}$ will be progressively decreased as shown in FIG. 3b, resulting in progressive decrease in the output voltage $E_t$ of the generator. When the output voltage $E_t$ reaches the set or reference voltage $E_m$ at a time point $t_2$, the comparator 91 will then produce logic "1" output. It will be appreciated that the reference voltage $E_m$ is set at a level as low as possible at which no failure in commutation by the thyristors may yet occur. At the time point $t_2$, the bypass pair is estalished in the converter 4. Next, description will be made on how the bypass pair is formed with the aid of FIG. 4. As described hereinbefore, when the generator stop command is present, the converter 4 is operated in the inverter mode. Then, the control pulses $P_{10}$ to $P_{60}$ shown in FIG. 4a are produced from the automatic pulse phase-shifter 7. The firing pulse $P_1$ to $P_6$ shown in FIG. 4b are produced from the firing circuit according to the output pulses $P_{10}$ to $P_{60}$ from the pulse phase-shifter 7. Due to such inverter mode operation, the output voltage $E_t$ of the generator 1 is lowered. When the voltage $E_t$ reaches the reference voltage $E_m$, the comparator 91 produces logic "1". Then, the AND gate 92 applies logic "1" to both the OR gate 85 and the flip-flop 93 under the presence of the output pulse $P_{10}$ from the automatic pulse phase-shifter 7. Accordingly, logic "1" appears at the output of OR gate 85 to produce the firing pulse $P_4$ at the output of the firing circuit 75. In this manner, the firing pulses $P_1$ and $P_4$ are simultaneously applied to the thyristors $V_1$ and $V_4$, whereby the bypass pair is thus established. On the other hand, the flip-flop 93 applied with logic "1" from the AND gate 92 produces logic "0" instead of logic "1" thereby to feed logic "0" to the AND gates 8a to 8f. Accordingly, after the bypass pair has been formed, all the output pulses $P_{10}$ to $P_{60}$ from the automatic pulse phase shifter 7 are thereafter suppressed, resulting in no firing pulses applied to the thyristors $V_1$ to $V_6$ for the commutating operations thereof. Since the bypass pair is continuously held, the field current $I_{fd}$ is attenuated finally to zero with a time constant determined by inductance and resistance of the field winding.

In the above description, it is assumed that the bypass pair or short circuit is constituted through the thyristors $V_1$ and $V_4$. However, it will be readily appreciated that the short circuit may be formed by the bypass pair of thyristors $V_3$ and $V_6$ or alternatively $V_2$ and $V_5$ in a similar manner. Although the bypass or short circuit state is established by firing at first a thyristor at the positive pole side and then firing the counterpart thyristor at the negative pole side for the same phase as that of the first thyristor, it will be understood that the same effect can be accomplished even if the firing is effected in the reverse order.

FIG. 5 shows another embodiment of the excitation control apparatus according to the invention. This excitation control apparatus is arranged such that, during the inverter mode operation of the converter 4 as triggered by the generator stop command, all the firing pulses for the thyristors connected to either one of positive pole or negative pole of the converter 4 are suppressed when the output voltage of the generator 1 becomes lower than a predetermined value, and subsequently all the firing pulse to be supplied to the thyristors connected to the other opposite poles of the converter 4 are suppressed when the current at the a.c. side of the converter becomes zero, thereby to establish a bypass pair. Since detection of field current at the a.c. side is required in the case of the embodiment shown in FIG. 5, a current transformer CT has to be employed. However, a current transformer for detecting overcurrent in the thyristor circuit which is usually provided, may be used for the purpose without providing an additional current transformer. In FIG. 5, the same elements or parts as those shown in FIG. 1 are denoted by the same reference numerals and further description thereof will be unnecessary. Description will be made only to those parts or element attached with new reference numerals. A detection part 10 for detecting field current at the a.c. side is composed of a detector 100 for rectifying, for detection of, an a.c. current available through the current transformer CT and a level detector 105 adapted to produce a logic "1" signal when the rectified current becomes zero and produce otherwise logic "0" output. Reference symbols 92a and 92b denote AND gates, while 93a and 93b designate flip-flops, respectively. The embodiment shown in FIG. 5 is differred from the one shown in FIG. 1 in the process for establishing or forming the bypass pair of the thyristors. Accordingly, description will primarily directed to the bypass pair establishing circuit 9 with the aid of FIGS. 6a to 6d. When the stop command for the synchronous generator 1 is present, the automatic pulse phase-shifter 7 will produce output pulses $P_{10}$ to $P_{60}$ such as shown in FIG. 6a and the operation of the converter 4 is changed to the inverter mode in a similar manner as described hereinbefore in conjunction with FIG. 1. In the case of the embodiment now described, it is assumed that a command signal for suppressing firing pulses applied to the thyristors connected to the negative pole of the converter 4 is produced during the conductive state of the thyristor $V_1$. When the output voltage $E_t$ of the generator reaches at the set or reference voltage $E_m$, the comparator 91 produces logic "1" as shown in FIG. 6b. Thus, the output of the AND gate 92a is changed from logic "0" to "1" and applied to the set terminal S of the flip-flop 93a. Then, the output signal appearing at the output terminal 0 of the flip-flop 93a is changed from logic "1" to "0" which is supplied to the AND gates 8d, 8e and 8f. In this manner, when the logic output from the flip-flop 93a has become zero, all the outputs from the AND gates 8d, 8e and 8f become also logic "0" and remain in this state, whereby the firing pulses $P_4$, $P_6$ and $P_2$ to be applied to the thyristors $V_4$, $V_6$ and $V_2$, respectively, are not produced. In other words, all the firing pulses to the thyristors belonging to the negative pole of the converter 4 are suppressed. As can be seen from FIG. 6c illustrating the outputs from the firing circuit 75, since the firing pulse $P_2$ and $P_4$ are not produced after the firing pulse $P_6$ has been output, only the thyristor $V_6$ supplied with the firing pulse $P_6$ continues to be conductive. Subsequently, when the firing pulse $P_3$ among those $P_1$, $P_3$ and $P_5$ to be applied to the thyristors $V_1$, $V_3$ and $V_5$, respectively, belonging to the positive pole side of the converter is produced, the thyristor $V_3$ which is a counterpart to the thyristor $V_6$ becomes conductive, thereby to establish the bypass pair or the thyristors $V_3$ and $V_6$. Under the circumstance, the field current at the a.c. side of the converter 4 becomes zero and the level detector 105 then produces logic "1". Simultaneously, the output from the AND gate 92b becomes logic "1" to set the flip-flop 93b. The output signal appearing at the terminal 0 of the flip-flop 93b is then changed from logic "1" to logic "0" which is supplied to the AND gates 8a, 8b and 8c. In this manner, after the output from the flip-flop 93b has become logic "0", the outputs from all the AND gates 8a, 8b and 8c also become logic "0", as a result of which the firing pulses $P_1$, $P_3$ and $P_5$ to be applied to the thyristors $V_1$, $V_3$ and $V_5$ belonging to the positive pole of the converter 4 are not produced. In other words, the firing pulses for the thyristors connected to the positive pole are suppressed in succession to the firing pulse supplied to the thyristors at the negative pole side. Thereafter, the established bypass pair of the thyristors $V_3$ and $V_6$ is maintained. The field current $I_{fd}$ will thus be attenuated finally to zero with a time constant determined by inductance and resistance of the field winding. In this connection, it is to be noted that the pair of thyristors which constitute the bypass pair are selected in dependence upon output conditions ($P_{10} \sim P_{60}$) of the automatic pulse phase-shifter 7 existing at the time when the comparator 91 outputs logic "1" or when the output voltage $E_t$ of the generator 1 has reached the set reference voltage $E_m$.

FIG. 7 shows still another embodiment of the invention. This excitation control apparatus is arranged such that, during the inverter mode operation of the converter 4 triggered by the generator stop command, all the firing pulses for the thyristors connected to either one of positive pole or negative pole of the converter 4 are suppressed when the output voltage of the generator 1 becomes lower than a predetermined value, and subsequently all the firing pulses supplied to the thyristors connected to the other opposite pole of the converter 4 are suppressed when the d.c. output voltage $E_{fd}$ of the converter becomes zero, thereby to establish a bypass pair of conducting thyristors. The embodiment shown in FIG. 7 is differred from the one shown in FIG. 5 in the process for suppressing the firing pulses for the thyristors. In the case of the excitation control apparatus shown in FIG. 7, the d.c. output voltage from the converter 4 is monitored. This embodiment may be applied to the case where the current transformer CT is not, or should not desirably be, provided at the a.c. side of the converter. In FIG. 7, reference numeral 10 denotes a detection part for detecting the d.c. output voltage $E_{fd}$ from the converter 4 which is composed of a field voltage detector 110 and a level detector 115 adapted to produce logic "1" when the field voltage $E_{fd}$ becomes zero and to produce otherwise logic "0". In other respects, the embodiment shown in FIG. 7 is similar to the one shown in FIG. 5 and described above in conjunction with FIG. 6 which is also referred to in the following brief description on the embodiment shown in FIG. 7.

When the generator is to be stopped, the operator operates such as a key switch so as to reduce the output voltage $E_t$ of the generator and also to cause the generator stop command unit to produce a logic "1". When the output voltage $E_t$ reduces to less than the predetermined set value $E_m$, the comparator 91 produces a logic "1". Then the AND gate 92a produces a logic "1" which is applied to the set terminal S of the flip-flop 93a, thereby changing the output at the terminal "0" from logic "1" to logic "0". The output of logic "0" is applied to the AND gates 8d, 8e and 8f so as to suppress the firing pulses from being applied to the firing circuits $V_4$, $V_6$, and $V_2$ for the negative pole thyristors. Now assume that the above suppression of the firing pulses happens while the positive pole thyristor $V_1$ is conductive. When the firing pulses to the thyristors connected to the negative pole of the converter 4 are suppressed, no commutation takes place from the thyristor $V_6$ to $V_2$, since the firing pulse $P_2$ is suppressed. Subsequently, when the firing pulse $P_3$ is outputted, current is commutated from the thyristor $V_1$ to $V_3$ and instantaneously the thyristors $V_3$ and $V_6$ become conductive to establish a short circuit. Under such condition, the d.c. output voltage $E_{fd}$ from the converter becomes zero, resulting in the output of the field voltage detector 110 also becoming zero. By the detection of such prevailing condition by the level detector, the firing pulses for the positive pole thyristors are suppressed with the suppression of the firing pulses for the negative pole thyristors being continuously maintained. Thereafter, no commutation takes place in the converter 4 which is thus held in the short-circuited condition with the bypass pair established. Accordingly, the field current $I_{fd}$ is attenuated finally to zero with a time constant determined by inductance and resistance of the field winding.

FIG. 8 shows a further embodiment of the excitation control apparatus according to the invention. This embodiment is arranged such that, during the inverter mode operation of the converter 4 as initiated by the generator stop command, all the firing pulses for the thyristors connected to either one of positive or negative pole of the converter 4 are suppressed when the output voltage $E_t$ of the generator 1 becomes lower than a predetermined value, and subsequently all the firing pulses to be supplied to the thyristors connected to the other pole of the converter 4 are suppressed at the time when one of these firing pulses to the other pole thyristors is produced. In the case of the embodiment shown in FIG. 8, either field current detector or field voltage detector which are required in the embodiments shown in FIGS. 5 and 7, respectively, is unnecessary. Suppression of predetermined firing pulses for the individual thyristors $V_1$ to $V_6$ is carried out in dependence upon conditions of the output pulses $P_{10}$ to $P_{60}$ from the automatic pulse phase-shifter. Description on these parts or elements of the apparatus shown in FIG. 8 which are denoted by the same reference symbols as those in FIGS. 1 and 5 will be omitted, since they serve the same functions as described hereinbefore. In FIG. 8, reference numerals 86 and 87 denote OR gates, 94 and 96 are AND gates and 95 designates a flip-flop.

Now, operations of the excitation control apparatus shown in FIG. 8 will be described by referring to FIGS. 9a to 9d. When the stop command or instruction for the generator 1 is present, the automatic pulse phase-shifter 7 produces output pulses $P_{10}$ to $P_{60}$ shown in FIG. 9a, thereby changing over the converter 4 to the inverter mode operation, as described hereinbefore. When the output voltage $E_t$ of the generator 1 reaches the reference voltage $E_m$, the comparator 91 outputs a logic "1" as shown in FIG. 9b. Thus, the output of the AND gate 92a is switched from logic "0" to logic "1" which is applied to the set terminal S of the flip-flop 93a, resulting in change of the output at the terminal 1 thereof to logic "1" from logic "0". The logic "1" output is then supplied to the AND gate 94. Further, the output at the terminal O pf the same flip-flop 93a is changed from logic "1" to logic "0" which is then supplied to the AND gates 8d, 8e and 8f. Thereafter, the firing pulses to be applied to the thyristors $V_4$, $V_6$ and $V_2$ belonging to the negative pole of the converter 4 are all suppressed. On the other hand, the Or gate 86 produces a logic "1" in response to the appearance of one of the output pulses $P_{46}$, $P_{60}$ and $P_{20}$ from the automatic pulse phase-shifter 7. The logic "1" signal from the OR gate 86 is then supplied to the AND gate 94 along with the output from the terminal 1 of the flip-flop 93a, resulting in logic "1" output from the AND gate 94 which is in turn applied to the set terminal S of the flip-flop 95. In this manner, the flip-flop 95 is set to change the output at the terminal 1 from logic "0" to "1". Subsequently, upon appearance of one of output pulses $P_{10}$, $P_{30}$ and $P_{50}$ from the automatic pulse phase-shifter 7, the OR gate 87 will then produce logic "1" which is supplied to the AND gate 96 together with the output from the terminal 1 of the flip-flop 95. At this instant, the thyristors $V_3$ and $V_6$ become conductive to form the bypass pair, as can be seen from FIG. 9d. The AND gate 92b sets the flip-flop 93b in response to the outputs from the AND gates 96 and 92a. Consequently, the signal level at the output terminal O of the flip-flop is changed from logic "1" to logic "0" which is then supplied to the AND gates 8a, 8b and 8c. Thereafter, the firing pulses to be supplied to the thyristors $V_1$, $V_3$ and $V_5$ connected to the positive pole of the converter 4 are all suppressed with the bypass pair of thyristors $V_3$ and $V_6$ maintained continuously, until the field current $I_{fd}$ has been attenuated finally to zero with a time constant determined by inductance and resistance of the field winding.

In the above descriptions of the embodiments shown in FIGS. 5, 7 and 8, it has been assumed that the firing pulses to be applied to the thyristors at the positive pole side of the converter 4 are first suppressed and thereafter the firing pulses for the negative pole thyristors are suppressed. However, it will be readily appreciated that the order of firing pulse suppresion may be reversed with the same effect. Further, although the condition for the logic output from the comparator 91 depends on whether the output voltage $E_t$ of the generator becomes lower than the preset value $E_m$, the same effect can be accomplished by utilizing the condition of the field current $I_{fd}$ with respect to a preset reference current $I_m$ as shown in FIG. 10a or alternatively an output which is produced from a timer at a predetermined time interval required for the generator voltage or the field current to attain the respective reference level after appearance of the generator stop command.

What is claimed is:

1. An excitation control apparatus for controlling field excitation of a synchronous generator in which the field excitation is achieved by a d.c. output produced by rectifying an a.c. output voltage of the generator through a thyristor converter which is capable of operating as either a rectifier or an inverter, said apparatus comprising:
    (a) first means for changing the operation of said converter to an inverter mode operation in response to a command for stopping operation of said generator, and
    (b) second means for establishing a short-circuit in said converter immediately upon detecting a condition at which it is expected that said converter becomes incapable of being operated in the inverter mode.

2. An excitation control apparatus as set forth in claim 1, wherein said second means establish said short-circuit when the output voltage of the synchronous generator becomes lower than a predetermined value.

3. An excitation control apparatus as set forth in claim 1, wherein said second means establish said short circuit when a field current of the synchronous generator becomes lower than a predetermined value.

4. An excitation control apparatus as set forth in claim 1, wherein said second means establish said short circuit when a predetermined time interval has elapsed after appearance of said generator operation stop command.

5. An excitation control apparatus as set forth in claim 1, wherein said second means comprise:
    (a) means for applying a firing pulse synchronized with a firing pulse applied to one of thyristors constituting said converter at one pole thereof to a thyristor for the same phase as said one thyristor at the opposite pole of said converter, and
    (b) means for suppressing subsequently all the firing pulses for all the thyristors.

6. An excitation control apparatus as set forth in claim 1, wherein said second means comprise:
    (a) means for suppressing firing pulses supplied to those thyristors connected to either one of positive pole terminal or negative pole terminal of said converter, and
    (b) means for suppressing firing pulses supplied to the thyristors connected to the remaining pole terminal of said converter when current at a.c. side of said converter becomes zero.

7. An excitation control apparatus as set forth in claim 1, wherein said second means comprise;
    (a) means for suppressing firing pulses supplied to those thyristors connected to either one of positive pole terminal or negative pole terminal of said converter, and (b) means for suppressing firing pulses supplied to the thyristors connected to the remaining pole terminal of said converter when d.c. output voltage of said converter becomes zero.

8. An excitation control apparatus as set forth in claim 1, wherein said second means comprise:

(a) means for suppressing firing pulses supplied to those thyristors connected to either one of positive pole terminal or negative pole terminal of said converter, (b) means for suppressing firing pulses supplied to the remaining thyristors when one of firing pulses associated with said remaining thyristors is produced.

* * * * *